June 10, 1958 V. LODHOLM 2,837,949
MACHINE FOR APPLYING PRESSURE CLAMPS
Filed March 12, 1956 7 Sheets-Sheet 1
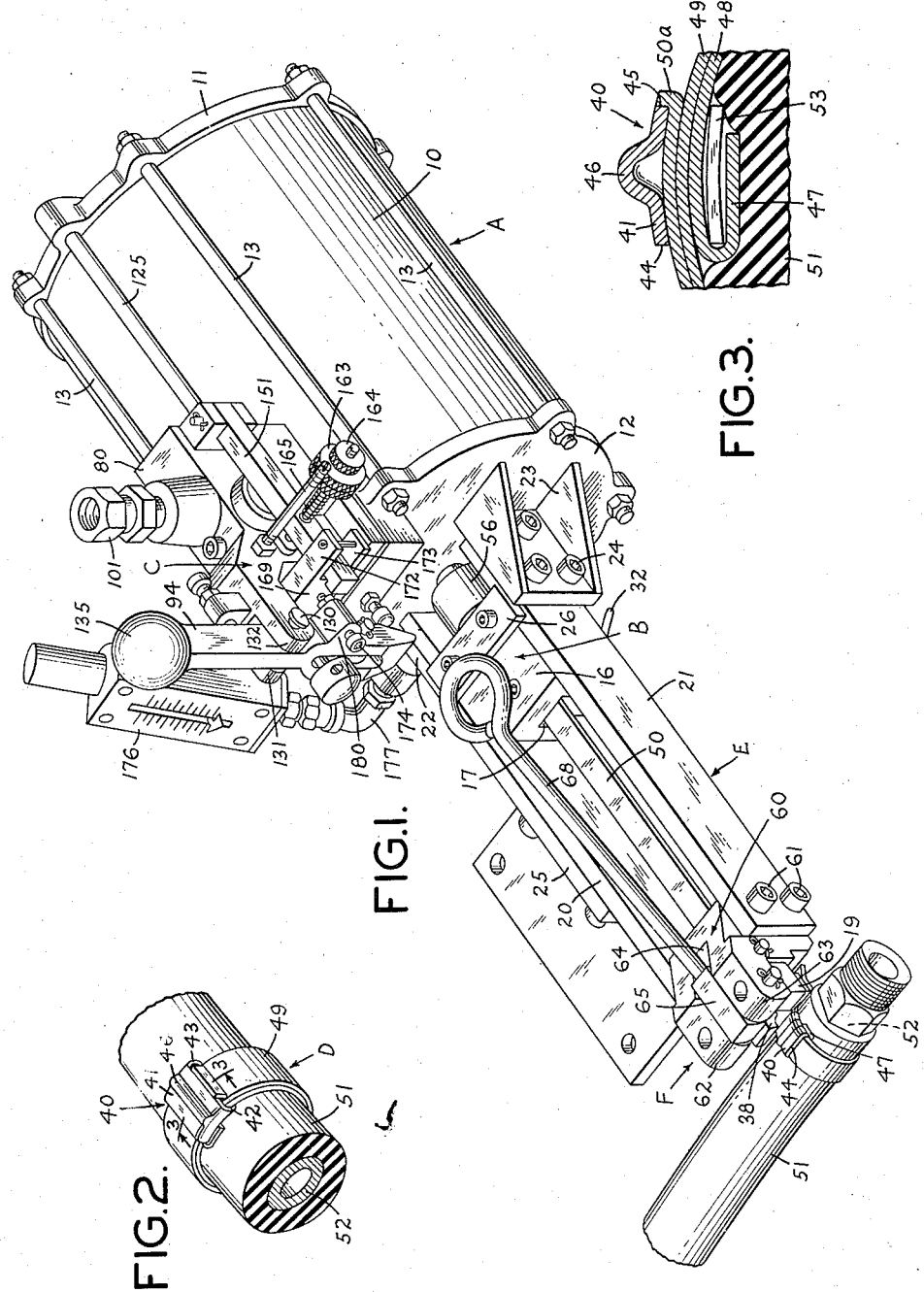

June 10, 1958 V. LODHOLM 2,837,949
MACHINE FOR APPLYING PRESSURE CLAMPS
Filed March 12, 1956 7 Sheets-Sheet 2

June 10, 1958 V. LODHOLM 2,837,949
MACHINE FOR APPLYING PRESSURE CLAMPS
Filed March 12, 1956 7 Sheets-Sheet 3

June 10, 1958     V. LODHOLM     2,837,949
MACHINE FOR APPLYING PRESSURE CLAMPS
Filed March 12, 1956     7 Sheets-Sheet 5

June 10, 1958 V. LODHOLM 2,837,949
MACHINE FOR APPLYING PRESSURE CLAMPS
Filed March 12, 1956 7 Sheets-Sheet 6

June 10, 1958 V. LODHOLM 2,837,949
MACHINE FOR APPLYING PRESSURE CLAMPS
Filed March 12, 1956
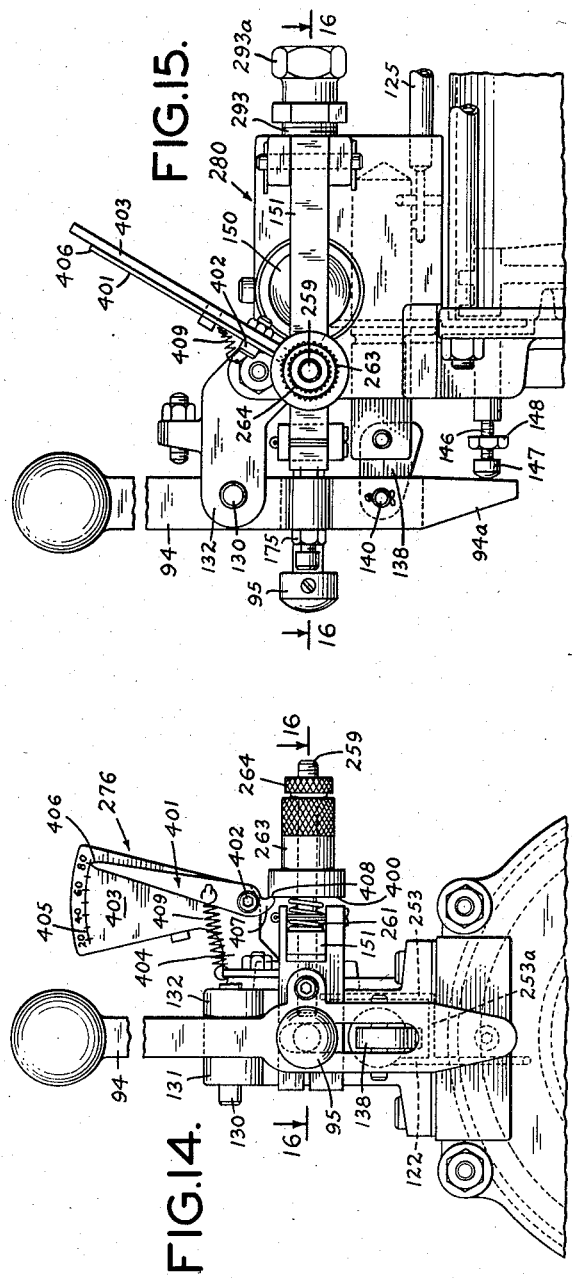
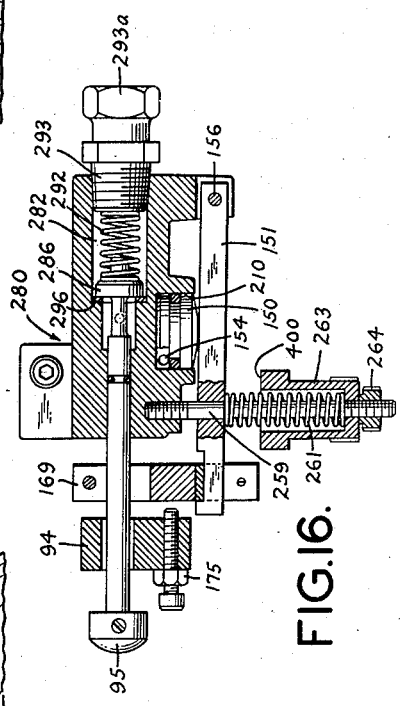

United States Patent Office 2,837,949
Patented June 10, 1958

2,837,949
MACHINE FOR APPLYING PRESSURE CLAMPS

Valdemar Lodholm, Denver, Colo., assignor to Band-It Company, Denver, Colo., a corporation of Colorado Application March 12, 1956, Serial No. 571,045

11 Claims. (Cl. 81—9.3)

This invention relates generally to machines for applying pressure clamps and in particular to power operated machines.

Pressure clamps referred to herein are of that type which comprises a length of strap connected at one end to a buckle, the strap having a loop which passes around the article to be clamped one or more times, the outer end of the strap being pulled taut and then fastened in some way to the buckle so that the clamp tightly grips the article. These pressure clamps (sometimes more conveniently referred to as hose clamps) are used for many purposes: as for attaching a hose to a nipple or the like, for assembling wooden water pipes, for splicing electrical welding cable, for making up flexible cable line taps and for other purposes. Inasmuch as one of the most common uses for pressure clamps is for clamping hose to a nipple, this type of pressure clamp will be herein sometimes referred to merely as a hose clamp but it will be understood that the term is used for convenience of description and that the clamps of the kind referred to may be used for other purposes than clamping hose. Moreover, the machines embodying the invention are not limited in use to applying pressure clamps to hoses.

There are a number of hand tools available in the market for applying hose clamps; these tools being operated by hand and the power used is manual. These hand tools work satisfactorily in many types of work but in those cases in which large numbers of clamps are to be applied or where large volume production clamping is necessary, the hand tools have drawbacks. Among other things, they require manual effort and sometimes the work may become arduous. Furthermore, uniformity of clamping pressure from clamp to clamp is not always easy of attainment.

It is an object of this invention to provide a power operated machine for applying hose clamps.

In accordance with the invention the power operated machine is provided with a pressure-fluid operated piston, reciprocatable in a main cylinder, the piston rod of which is provided with means to grasp the free or outer end of the clamp strap after it is placed around the article to be clamped, and to pull it taut and means are provided to fasten the strap and to finish off the clamp so that it remains clamped tightly to the article, and presents a neat appearance.

According to features of certain embodiments of the invention, the piston in the main cylinder is operated by compressed air and a novel valve arrangement is provided which will cause the air driven piston to operate in a controlled manner; first to pull the free end of the strap of the hose clamp to put the loops of the clamp strap under a pre-determined tension, then to release the pull sufficiently to provide slack for bending the outer end of the strap against the buckle, after which a cutting mechanism may be operated to cut off any protruding excess portion of the strap thereby to produce a pressure clamp having a neat appearance and yet tightly gripping the hose. After the strap has been cut off and the clamped hose released, the valve arrangement for operating the piston in the main cylinder is such that the piston rod may be quickly returned to its starting position for repeating the cycle for applying another hose clamp.

Although the novel features which are believed to be characteristic of the invention are pointed out in the annexed claims, the invention itself as to its objects and advantages and the manner in which it may be carried out may be better understood by reference to the following detailed description taken in connection with the accompanying drawings, forming a part hereof, in which:

Fig. 1 is a perspective of a machine embodying the invention showing a pressure clamp being applied to a hose, the strap of the clamp having been pulled taut by the main piston;

Fig. 2 is a perspective view of the hose with the finished clamp after it has been clamped on the hose;

Fig. 3 is a section on line 3—3 of Fig. 2, to larger scale showing how the outer end of the strap appears after the excess protruding end has been cut off;

Fig. 5 is a side view in elevation of the machine (broken away or foreshortened) showing the clamp in position on the hose at the beginning of the operation and ready to be pulled taut;

Fig. 6 is a partial plan view showing the control valve;

Fig. 14 is a front view of a modified form of valve and showing a novel pressure indicator arrangement;

Fig. 15 is a side view in elevation of the modification shown in Fig. 14; and

Fig. 16 is a horizontal section through the modified form of valve on line 16—16 of Fig. 15.

Figure 4:
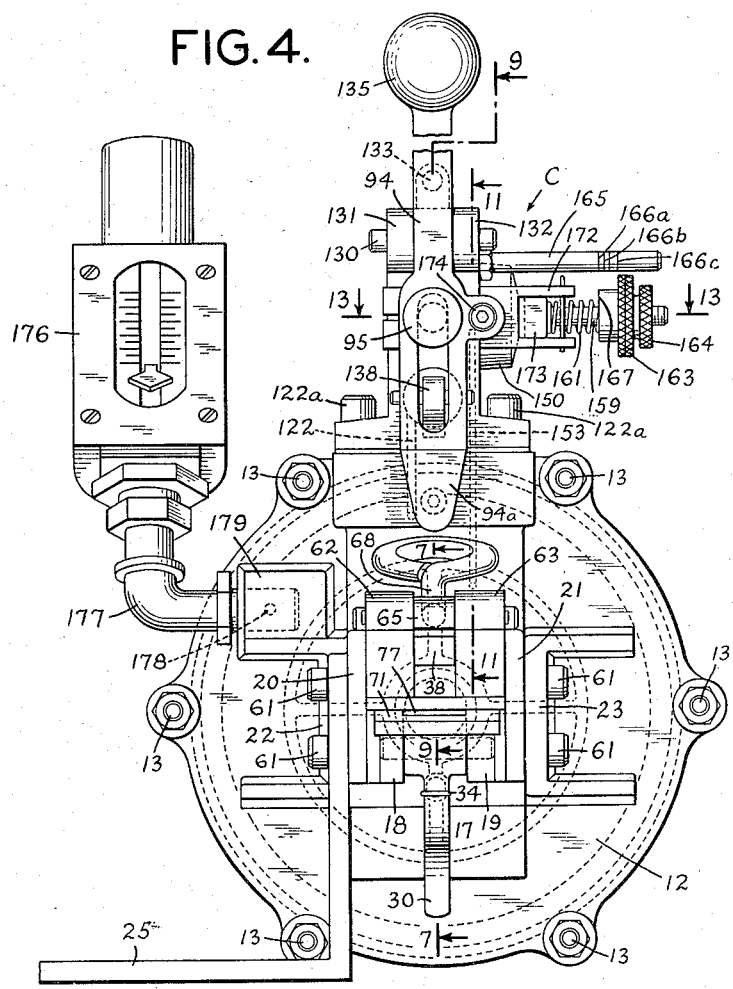
Fig. 4 is a front view in elevation of the machine shown in Fig. 1.

Referring now to the drawings, in which like reference characters indicate similar parts throughout the several views, the machine, in general (see Fig. 1), comprises a main cylinder A in which is mounted for reciprocation a piston to which is secured a piston rod; the piston being operated by compressed air from a suitable source (not shown). On the outer end of the piston rod is mounted a strap gripping mechanism B for gripping the protruding end of the strap of a hose clamp D. Extending from the cylinder head are a pair of side rail guides mounted in parallel spaced relation providing a guide frame E along which the strap gripper B moves. On the outer end of the guide frame E is mounted a strap cutter mechanism F for cutting off the portion of the strap which protrudes beyond the buckle of the hose clamp, after the clamp has been tightened on the hose. The operation of the piston in the main cylinder A is controlled by a control valve device C which is arranged so that by manpiulation of a control lever, the compressed air from the compressed air source is directed into the main cylinder to drive the piston rearwardly to pull the strap of the clamp so that it is tightened on the hose, then the compressed air is automatically shut off by a tripping mechanism in the valve device C when a pre-determined pull is exerted on the strap of the hose clamp D and then, by manipulation of the control lever, the pull on the strap is slackened off sufficiently to permit the hose to be turned on its longitudinal axis to bend the protruding end of the strap against the clamp buckle; immediately after which the cutting mechanism F may be manually operated to cut off the protruding end of the strap and provide a finished hose clamp tightly gripping the hose. The control lever may then be manipulated to direct compressed air into the main cylinder to return the piston in a forward stroke to its starting position ready to repeat the cycle for applying another hose clamp.

The main cylinder mechanism A comprises a cylinder 10 closed at its rear end by an end cover 11 and having at its forward end a cylinder head 12; the end cover and head being securely held in place by cylinder stay bolts 13. Mounted for reciprocation in cylinder 10 is a piston 14 (see also, Figs. 5 and 9) to which is secured a piston rod 15, held in place by nut 57. The piston 14 is provided with a resilient sealing ring 54 and the piston rod 15 with a resilient sealing ring 55. On the outside of the cylinder head and slidably mounted on piston rod 15 there is a cylindrical elastomer bumper sleeve 56.

The strap gripping mechanism B (see Figs. 4, 5 and 7) is at the outer end of the piston rod 15 which is in the form of a bifurcated block 16, providing a slot 17 between two depending side arms 18, 19. The width of the slot 17 is wide enough to permit bands of a wide range of widths to pass through it. The gripper block 16 is movable longitudinally between the guide frame E which is provided by two parallel side rails 20, 21 mounted, as by screws 24, at their inner ends to mounting brackets 22, 23 cast to the cylinder head 12. A right angle bracket 25 secured to side guide rail 20 provides means for mounting the machine solidly on a suitable working surface, such as a work bench. The gripper block 16 is provided with guide plate 26 which is removably secured to the top surface of the block by screws 27. The under surfaces of the outer ends of the plate 26 engage and ride on the top edges of the guide rails 20, 21.

Figure 7:
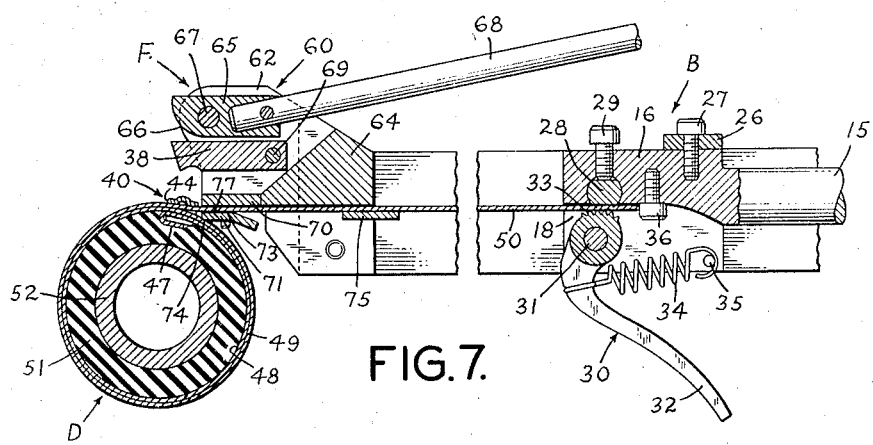
Fig. 7 is a section on line 7—7 of Fig. 4 showing the mechanism for grasping the free end of the strap of the clamp and also the cutting mechanism.

Extending through bores in the depending side arms 18, 19 of gripper block 16, is a hardened steel pin 28, flattened slightly so that its flattened surface is substantially flush with the bottom side of the top wall of the slot 17. This hard steel pin 28, which is held in place by set screw 29, provides a friction surface against which the outer end portion 50 of the strap of hose clamp D may be gripped. Mounted below the friction pin 28 is a pivotally mounted cam lever 30. The cam lever 30 is mounted on pivot pin 31, in turn journaled in registering bores in the depending arms 18, 19 of the gripper block 16, and it has a depending handle 32. The cam lever has a fluted or milled surface 33 which is cam-shaped so that when the strap 50 extends through the slot 17, between the friction pin 28 and the cam surface 33 and the cam lever is urged counterclockwise (as viewed in Fig. 7), the end portion 50 of the strap of the hose clamp D is tightly gripped. A helical tension spring 34, having one end secured to the handle 32 of the cam lever 30 and the other end to a pin 35 on block 16, normally urges the cam surface 33 to gripping position (as shown in Fig. 7). To release the grip, for example, after a hose clamp has been applied and the outer end of the strap cut off (as described in further detail hereinafter) and it is desired to remove the cut off end from the gripper mechanism, this may be done by rotating the handle 32 of the cam lever in clockwise direction to move the cam surface 33 further away from pin 28 thereby releasing the grip on the strap. The set screw 36 in block 16 is used to push the cut off portion of the strap forward upon the return stroke of the piston rod 15, after a hose clamp has been applied by the machine.

The preferred type of hose clamp for use with the machine is that type which, before applying it to a hose, comprises a steel buckle to which is secured a length of steel strap at its inner end, the strap then being passed through the buckle to form two loops, the outer end of the strap then protruding from the buckle. Such a pressure clamp is disclosed in the application of Holbrook Mahn, Serial No. 321,006 (issued as Patent No. 2,746,107). Such a hose clamp is shown in Fig. 5 herein, applied to a hose but prior to pulling the strap to tighten it on the hose. The clamp comprises a buckle 40 which may be made from sheet steel stock. A suitable blank is bent to provide a top 41 and bent-in flanges 42, 43 to form a bottom wall 53, thus providing a tunnel space through which the strap is passed (see Figs. 1, 2, 3, 7, 8). The buckle has end edges 44 and 45. A ridge 46 may be formed in the top wall to add strength. The inner end 47 of the strap is hooked over the end of the bottom wall of the buckle, then the strap is passed through the buckle to form two loops 48, 49 and finally the outer end of the strap protrudes from the buckle as shown in Fig. 7, which shows the clamp placed about a hose 51 which in turn has had a nipple 52 inserted therein. Fig. 7 shows the clamp on the hose after the strap has been pulled taut by gripper B and the hose is ready to be turned to effect bending of strap portion 50 up against the end of the clamp buckle 40.

The cutter mechanism F comprises a cutter head block 60 mounted between the guide rails 20, 21 at their outer ends, the block 60 being held in place by screws 61. The block 60 is bifurcated, providing two oppositely disposed side arms or wings 62, 63 connected at their rear ends by a wall 64. Pivotally mounted in the space between the side arms 62, 63 is a cam lever 65 having a cam face 66, this lever being mounted on a pivot pin 67 extending through registering bores in side arms 62, 63. The pivoted cam lever 65 has secured thereto a cam handle 68 which normally rests on back wall 64 of the cutter head block 60. When the cam handle 68 is lifted or pulled upwardly it will rotate cam lever 65 about its pivot 67.

Pivotally mounted below the cam lever 65 is a hook lever 38 mounted on a pivot pin 69 located below and rearwardly of the pivot pin 67, and journaled in registering bores in side arms 62, 63 of the cutter head block 60.

Removably mounted on the underside of arms 62, 63 and cross-wise of the space between these arms, is a back-up plate 70, beneath which is mounted a shear blade 71; these two members being removably secured to the cutter head block 60 by means of screws 72 extending downwardly, one through each arm 62, 63 and extending through the end portions of back-up plate 70 and shear blade 71. It will be noted that the shear blade 71 is easily removable for replacement. It has a cut out portion 73 in its upper surface, thus to provide a slot 77 of sufficient depth and width to permit the outer end portion 50 of the strap of the hose clamp to pass through between the back-up plate 70 and the shear blade 71. It will be noted also that the shear blade is beveled slightly at its outer end to provide a sharp cutting edge 74.

A stop plate 75 is mounted at the underside of the rear end of block 60 just below the path of travel of the strap 60. The purpose of this stop plate 75 is to insure that the cam face 33 (see Fig. 7) of lever 30 moves away from pin 28 when the piston rod 15 is moved to the left (as viewed in Fig. 7) to starting position. The cam face lever 30 will engage the stop and the lever will be caused to be rotated counterclockwise about pivot 31 to release the grip of the cam on the strap 50, after the clamp has been applied to the hose and the protruding end of the strap has been cut off.

One of the significant and important features of the invention is the control valve mechanism C. The operation of this mechanism is controlled by a manually operated control lever which may be moved to three operating positions; these positions being herein referred to as the "pull" position, the "neutral" position, and the "return" position. In the pull position (see Fig. 10), the control valve directs compressed air from the source into the main cylinder to move the piston in a rearward stroke to pull the strap of the hose clamp tightly around the hose. In the neutral position (see Fig. 9), compressed air is shut off from the air pressure source and the air pressure then in the main cylinder is bled off. In this position the strap may be slackened sufficiently to permit the strap bending and cutting operation. In the return position (see Fig. 12), compressed air from the supply source is directed into the main cylinder to return the piston in a forward stroke (after the hose clamp has been applied and the excess protruding strap sheared off) to return the gripper head to the fore end of the machine to starting position so that the cycle may be repeated for applying another clamp.

Of particular significance is the feature of the control valve which provides means, responsive to changes in pressure in the main cylinder, for automatically "tripping" at a predetermined pressure to shut off the compressed air from the supply. The control valve may be adjusted to trip at any given pressure over a wide range of pressures. In other words, the machine is adapted to apply a predetermined pull or tension on the strap of the hose clamp when it is applied to the hose. And the adjustment for different amounts of pull or tension may be made quickly and easily. Consequently, a machine embodying this feature of the invention is adapted for applying hose clamps which may vary over a wide range of strap widths and strap strengths, while at the same time the machine may be adjusted to exert a pre-determined and proper pull on each so that most efficient use can be made of hose clamps, it being well known in the art that different sizes and kinds of hose connections may require wider or narrower straps and may require clamps of different tensile strengths. The control valve provided by the invention is easily and readily adjusted for applying different sizes and strengths of hose clamps to obtain maximum efficiency in their use.

The control valve mechanism C comprises a cylinder block 80 in which are provided three cylinder chambers 81, 82 and 110. The valve chamber 81 is reduced in diameter to provide an annular shoulder 83 to serve as a valve seat and the reduced bore portion provides an air chamber 84, said bore being further reduced in diameter to provide a passageway or guideway 85 for receiving a valve stem closely fitting but slidable in the guideway. Mounted for reciprocating movement in valve chamber 81 is an inlet valve 86, comprising a valve disc 87 secured to a stem 88 which passes through and is slidable in guideway 85. The valve stem 88 has a reduced shank portion 89 within the intermediate chamber 84 and is provided with a resilient sealing ring 90 mounted in a ring mounting groove in the stem. Mounted on the stem between the valve disc 87 and the valve seat 83 on the reduced shank portion 89 is a washer 96 of resilient but wear-resistant material, such as synthetic rubber, "neoprene," or similar composition. Extending coaxially with the valve stem 88 from the disc 87 on its opposite side is a cylindrical boss 91 over which is mounted one end of a helical compression springs 92, the other end of the springs resting against a plug 93, closing the rear end of the inlet valve chamber 81. The spring 92 normally urges the valve disc 87 onto its seat 83 to close the inlet valve thus providing a valve biasing means normally urging the inlet valve toward closed position. The valve stem 88 extends through the guideway 85 and through a slot 93 in the control lever 94, described in further detail hereinafter. Communicating with a source of compressed air is an air inlet conduit or passageway 108 which communicates with the interior of valve chamber 81 near the port 97. A suitable fitting 101 is threaded into the valve cylinder block for connection with the air pressure line (not shown), which in turn is connected to a source of air under pressure.

It will be seen that when the valve disc 87 is urged against the washer 96 which in turn is urged against valve seat 83, the air inlet port 97 is closed. And when the valve disc 87 is urged rearwardly against the force of spring 92 so that the air inlet passageway 96 is uncovered, compressed air may flow through passageway 108 into intermediate chamber 84. But escape of pressure through valve guideway 85 is prevented by sealing ring 90. A duct 98, closed by a removable plug 99 may be used to introduce lubricating oil from time to time into the interior of the valve, if desired. An air duct or passageway 100 provides communication between intermediate chamber 84 and valve chamber 82.

Figure 9:
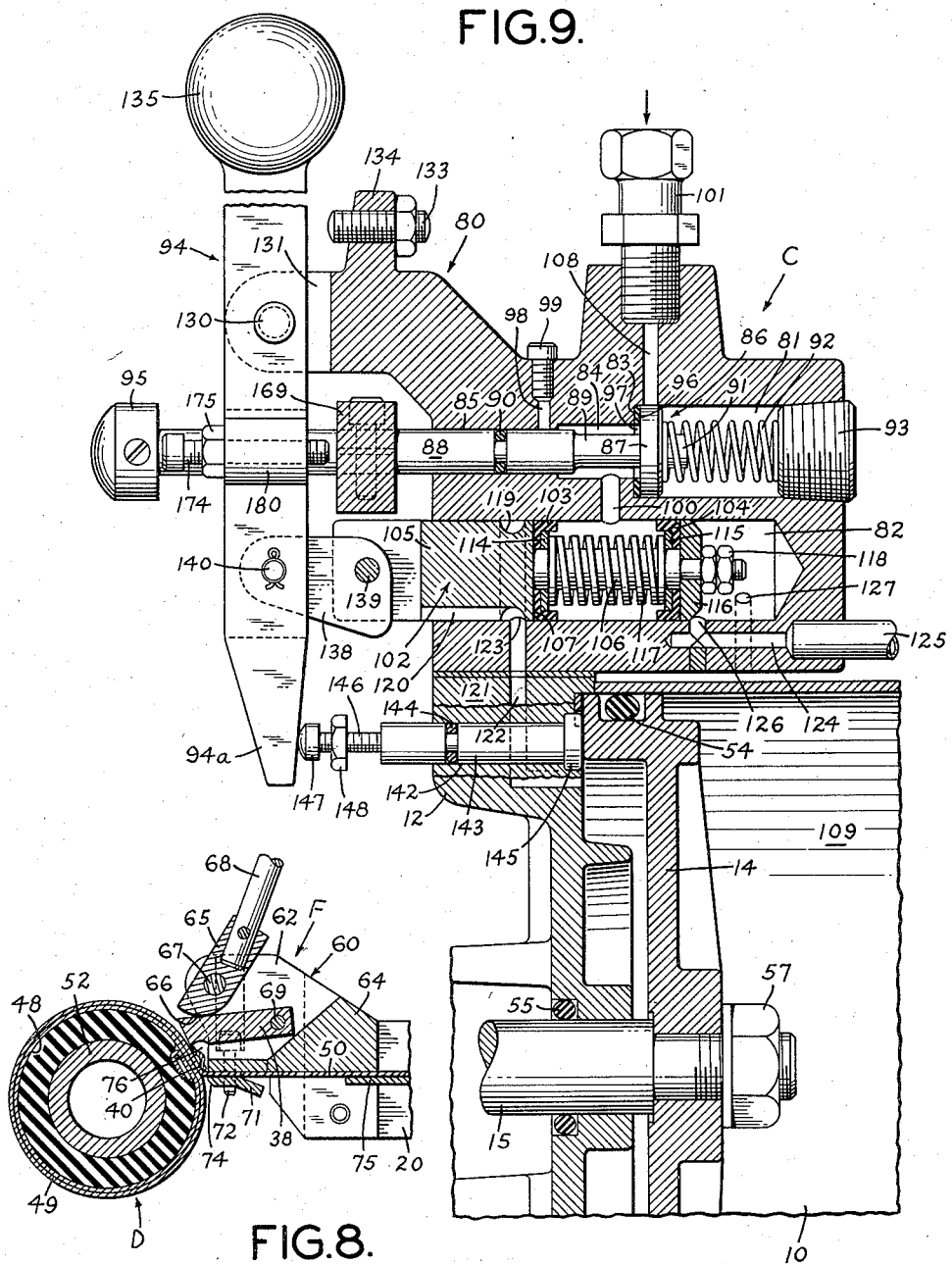
Fig. 9 is a longitudinal section of the machine taken generally on line 9—9 of Figs. 4 and 6, showing the position of the control valve parts when the control lever is in neutral position.

Mounted for reciprocation in valve chamber 82 is a double acting valve 102 (see Fig. 9). That is, this valve has two slide valve discs 103, 104 separated from each other but mounted on a single reciprocating stem, one of said discs being positioned on the stem to open and close one valve port and the other disc being positioned on the stem to open and close another valve port, one of which ports communicates with main cylinder chamber 109 at its front end and the other of which communicates with the main cylinder chamber 109 at its rear end. For convenience of description, these valves 103, 104 are sometimes referred to herein as cup valves.

The double acting control valve 102 comprises a stem portion 105 fitting snugly but slidably within cylinder 82 and a shank portion 106 extending coaxially from the stem portion 105. Mounted on the shank portion 106 and abutting the annular shoulder 107, provided by the stem portion 105, is a valve disc 103 which is in the form of a cup washer made of rubber, leather, or suitable wear-resistant resilient synthetic material. A flat retainer ring 114 maintains the cup washer 103 in position so that the valve disc or cup valve 103 engages the cylinder wall of cylinder chamber 82. Also mounted on the shank portion 106, is an oppositely disposed slide valve disc 104 like the cup valve 103 (but opposite hand thereto) held in place by retainer ring 115 and a back-up disc 116. The slide valve discs 103 and 104 are urged away from each other by a helical compression spring 117, one end of which seats against retainer ring 114 and the other end against retainer ring 115. Lock nuts 118 threaded on the shank end maintain the valve on the shank 106. The stem portion 105 has an annular groove 119 in its surface connecting with a longitudinal groove 120 in its surface, to permit escape of air from the cylinder chamber 109 when the control lever 94 is moved to neutral position, as described in further detail hereinafter.

The control valve cylinder block 80 is removably secured to a boss or extension 121 cast in the cylinder head 12, being held in place by means of screws 122a. An air passagewayway or conduit 122 in block 80 and boss 121 connects valve cylinder chamber 82 with main cylinder chamber 109 at its front end. It may be noted here that slide valve 103 may move to open port 123 of passageway 122 at the front end of cylinder 82 so that passageway 122 connects with groove 120. Or, valve 103 may move to open port 123 so that passageway 122 communicates with the space in cylinder 82 between the slide valves 103 and 104. The rear end of cylinder 82 is connected to the rear end of main cylinder chamber 109 by passageway or conduit 124 provided in block 80 and connected to pipe 125 mounted on the top of cylinder 10 and in turn connected to passageway 124a in the cylinder end cover 11. The port 126 provided by passageway 124 may be opened and closed by reciprocation of slide valve 104, so that passageway 124 may be connected with the rear end of main cylinder chamber 109 and the space between the slide valves 103 and 104; or, so that passageway 124 may be connected with the space in the cylinder 82 behind valve 104 which in turn communicates with the outside atmosphere through a passageway 127.

The control lever 94 is pivotally mounted on a pivot pin 130 in turn mounted in registering bores in oppositely disposed bracket arms 131 and 132 cast in block 80. An adjustable stop bolt 133 threaded into a tapped bore in an upwardly extending boss 134 provides an adjustable stop to limit rotation of lever 94 about pivot 130 in clockwise direction (as viewed in Fig. 9). The control lever is provided with a rounded hand knob 135 at its upper end. Valve stem 88 passes through a slot 93 in lever 94 but it is not fastened to the lever. The outer end of valve stem 105 is connected by a link 138 to the lower portion 94a of lever 94 below the pivot 130. Said link extends into slot 93 in the lever and into a slot in the end of valve stem 105 and is connected to the lever and the valve stem by means of pins 139, 140.

Figures 10, 11:
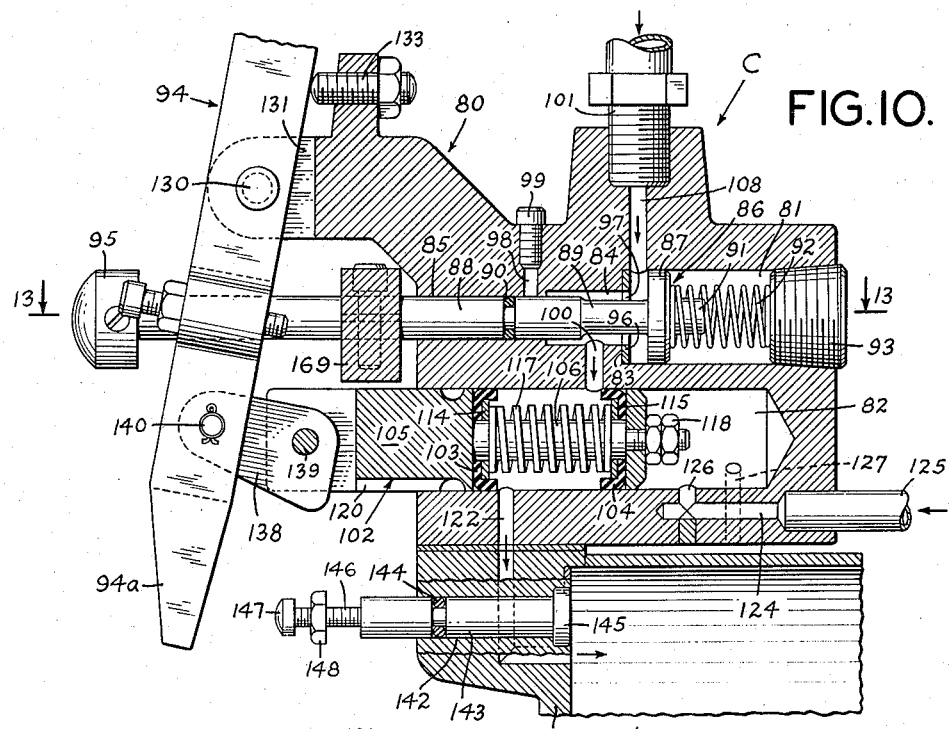
Fig. 10 is a longitudinal section similar to Fig. 9, showing the position of the valve parts when the control lever is in pull position.
Fig. 11 is a longitudinal section taken generally along line 11—11 of Fig. 4, showing the position of parts of the valve between the cylinder and pressure shut-off valve with the control lever in pull position.
Figure 12:
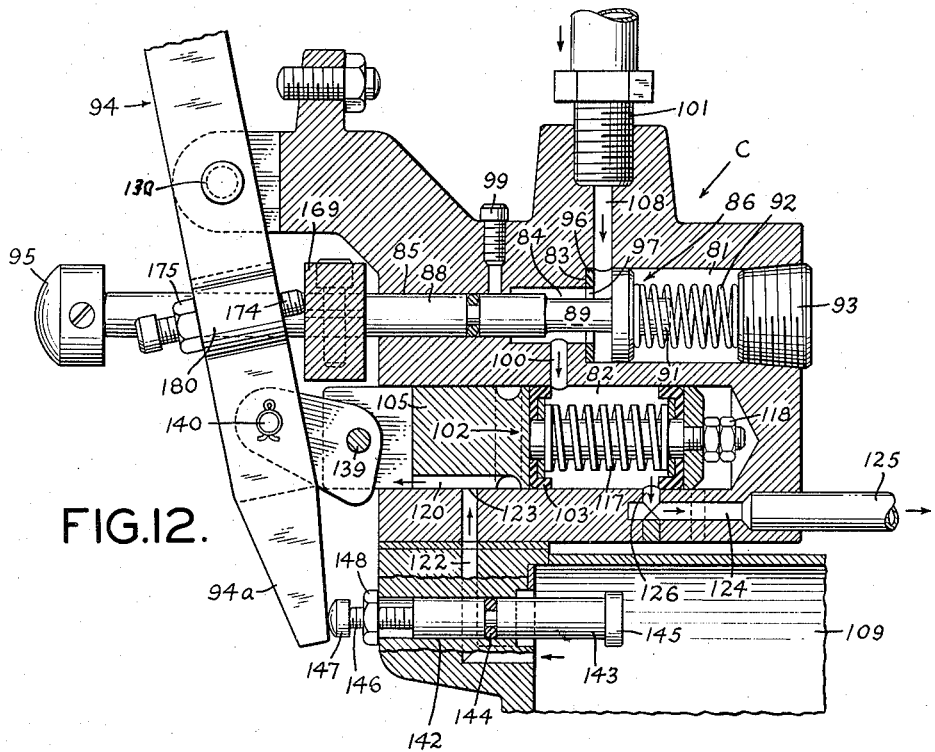
Fig. 12 is a longitudinal section similar to Figs. 9, 10, and 11 showing the position of the valve parts with the control lever in return position.

It may be noted here, that upon movement of the lever arm 94 to pull position, that is, by movement of the lever in clockwise direction about pivot 130 to the position shown in Fig. 10, conduit 122 communicates with the front end of cylinder chamber 109 and with the space in cylinder 82 between cup valves 103 and 104. Also, conduit 124 communicates with the rear end of cylinder chamber 109 and with the atmosphere through the space in cylinder 82, behind cup valve 104, and air conduit 127. When lever 94 is moved to neutral position as shown in Fig. 9, the cup valves 103, 104 are positioned inside the ports 123 and 126 so that conduit 122 connects with the atmosphere through groove 120 and conduit 124 connects with the atmosphere through conduit 127. And when lever 94 is moved to return position as shown in Fig. 12, conduit 122 connects with the atmosphere through groove 120 and conduit 124 connects with the space in chamber 82 between valves 103 and 104 but not with the outside atmosphere.

Snugly but slidably mounted in a bore 142 in casting 121 is a pusher rod 143 which is provided with a sealing ring 144 of resilient material mounted in a suitable annular groove. The inner end of rod 143 has an annular flanged head portion 145. In the outer end of rod 143 is mounted a screw threaded adjustable bolt 146 providing an adjustable stop head 147 which may be held in adjusted position by lock nut 148. As will be described later on, the flanged head pusher rod 143 is engaged by the piston 14 on the return stroke of the main piston so that when the gripper mechanism B is returned to starting position (as shown in Fig. 5) the lever 94 is moved to neutral position by the movement of the rod 143, the head of which engages the lower end 94a of lever 94.

The cylinder chamber 110 in cylinder block 80 has mounted within it for reciprocating movement a piston 150 (see Fig. 13) which, for convenience of description is herein called a "pusher" or "tripper" piston. This pusher piston 150 moves in response to change in pressure in the main cylinder chamber 109 and it serves to actuate a trip lever 151 which actuation results in closing off the air inlet valve 86 so that pressure from the air pressure source is shut off when the air pressure in cylinder 109 reaches a pre-determined desired pressure. As shown, the axis of cylinder chamber 110 is in substantially the same horizontal plane as the axis of cylinder chamber 81 but at right angles thereto. The pusher piston 150 is provided with a resilient sealing ring 152 mounted in a suitable annular groove. The rear end of cylinder chamber 110 is closed but a conduit 153, providing a port 154 at the rear end of chamber 110, connects cylinder chamber 110 with the front end of the main cylinder chamber 109 (see Figs. 11 and 13).

The trip lever 151 (see Figs. 1, 5, 13) is pivotally mounted at one end on a mounting bracket 155 on a vertically disposed pivot pin 156 so that the lever 151 may, within limits, swing in a horizontal plane through the axis of cylinder 110. The trip lever 151 lies alongside of cylinder block 80 and it engages the exposed end 157 of pusher piston 150 intermediate its ends. At a point beyond cylinder 110 is a bore 158 through the trip lever. An outwardly extending, horizontally disposed stud pin 159, extends through the bore 158. The stud pin is threaded at its inner end into cylinder block 80. The outer end portion 151a of the trip lever 151 has a square cornered notch 160 in its inner surface which in effect provides a hook end. Mounted on the stud pin 159 on its outer end portion is a helical compression spring 161, the inner end of which seats against an annular shoulder 162 in the bore 158 and outer end of which seats against an internally threaded milled nut 163 mounted to screw inwardly toward the block 80 and thus put a higher compression force on spring 161; or, outwardly away from block 80 to hold the spring 161 under lower or lesser compression force. A lock nut 164 threaded on stud pin 159 in engagement with compression adjusting nut 163, is provided to maintain the spring 161 at any desired and adjusted compression.

Now it will be seen that if piston 150 is moved in an outward direction toward trip lever 151 it will exert a force on the trip lever tending to swing it outwardly about pivot 156 and this swinging movement is opposed by the force of compression spring 161, which is exerting a force tending to swing the lever 151 inwardly about pivot 156. When the force exerted on pusher piston 150 is greater than the opposing force of spring 161, the trip lever 151 will be swung outwardly. By adjusting the compression on spring 161 by means of adjusting nut 163, the tripping device may be set to trip at any desired and predetermined pressure, within wide limits. That is, when the lever 151 is swung outwardly to release the hooked end from valve arm 169, the valve is "tripped." An index pin 165 (see Fig. 4), secured at its inner end to block 80, and parallel with stud pin 158, and having index rings 166 (a, b, c) at its outer end, provides indexing means for adjusting the compression on spring 161. When the inner surface 167 of nut 163 is opposite the inner index ring 166a, higher compression is exerted on spring 161 whereas the lowest compression on spring 161 exists when surface 167 is lined up with the outermost index ring 166c. The index rings may be calibrated for different sizes and widths of hose clamp straps.

Figure 13:
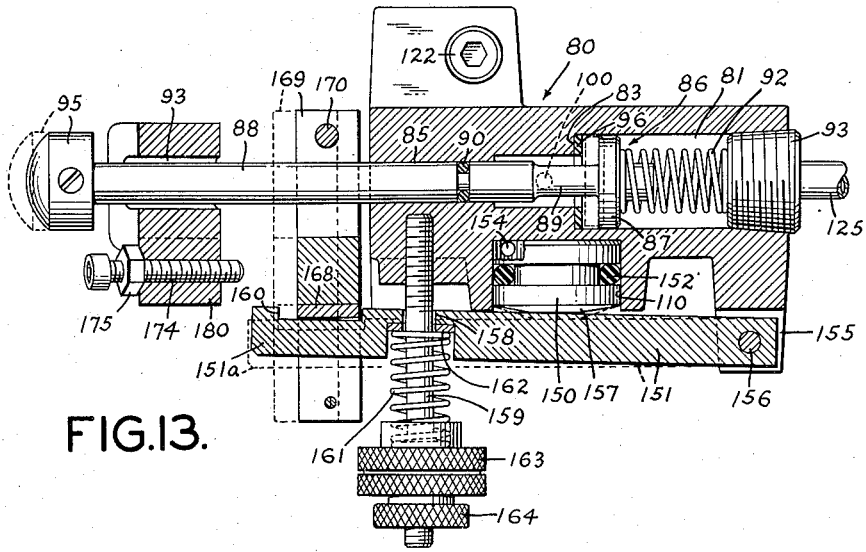
Fig. 13 is a horizontal section through the valve taken along line 13—13 of Figs. 4 and 5.

The outer end portion 151a of trip lever 151 (see Fig. 13) engages a friction block 168 fixed to inlet valve bar 169 fixed to and extending at right angles to inlet valve stem 88. This valve stem arm or bar 169 has a bore at one end through which valve stem 88 passes, the bar being split at its end and clamped to the stem by a screw bolt 170, or the bar 169 may be secured to the stem 88 in any other suitable manner. The outer end of valve arm bar 169 is bifurcated providing prongs 172, 173 (see Fig. 1), and as will be seen in Fig. 4, the valve arm 169 is mounted in substantially the same horizontal plane as the trip lever 151, whose outer end 151a extends between the prongs 172, 173. In normal position the friction block 168 of arm 169 lies within the notch 160 of trip lever 151 and normally the trip lever exerts sufficient force against the valve arm 169 to hold the inlet valve 86 in open position against the force of spring 92 as shown in Fig. 13 in full lines. However, when sufficient force is exerted on pusher piston 150 to overcome the opposing force of spring 161, the trip lever 151 is swung outwardly with the result that the notch 160 is moved away from friction block 169 and in effect the valve arm 169 becomes unhooked from lever arm 151 and this releases arm 169 so that spring 92 may force air inlet valve to closed position. That is, the arm 169 and lever 151 move to the positions shown in dot-dash lines in Fig. 13 and then spring 92 may move the inlet valve 86 to closed position. This movement will be explained further in the later description of the operation of the machine.

The control lever 94 also has an extension 180 through which is a bore in which is mounted a threaded bolt 174 provided with a lock nut 175. This bolt may be adjusted to contact the valve arm 169 when the control lever 94 is moved to return position and thereby move the valve stem 88 against the force of spring 92 to open the inlet valve to return the gripper mechanism B to starting position.

Mounted on the main cylinder A, to the side of the valve cylinder block 80 is a pressure gauge 176 (see Fig. 4) which is connected by pipes 177 to an air conduit 178 in an extension 179 cast to cylinder head 12. The air conduit 178 communicates with main air cylinder chamber 109. Consequently the gauge 176 will indicate the pressure which exists in chamber 109, and also within the trip valve chamber 110 because this chamber also communicates with chamber 109 through conduit 153.

The operation of the machine is as follows: Assuming that it is desired to apply a hose clamp D to hose 51 in which has been inserted a nipple connector 52. The hose clamp is placed over the end of the hose, and the nipple inserted as shown in Fig. 5. The protruding strap end 50 of the hose clamp is inserted through the slot between the back-up bar 70 and shear blade 71, and between the pin 28 and the cam face 33 of cam lever 30. It will be understood that the machine will first have been operated to bring the parts to starting position as shown in Fig. 5. This is accomplished by moving the control lever 94 to return position, which drives piston 14 in a forward stroke, it being noted that when the piston reaches the end of the forward stroke, pusher rod 146 moves control lever 94 to neutral position, as shown in Figs. 5 and 9. In neutral position (see Fig. 9) inlet valve 86 is closed and compressed air cannot flow from the source (not shown) through conduit 88 into the valve chambers. However, in neutral position, cup valves 103, 104 are both inside of ports 123 and 126. In this position, as shown in Fig. 9, air is vented to the atmosphere from both sides of piston 14 in main cylinder 10. Air passes from the space in front of piston 14, through conduit 122 and groove 120 to atmosphere and from the space back of piston 14 through conduit 124a, pipe 125, conduit 124, cylinder chamber 82 and conduit 127 to atmosphere.

The hose, clamp, and connector having been placed in the position shown in Fig. 5, the gripper mechanism B, now grips the strap end 50 and the end 45 of buckle 40 engages the back-up plate 70 of the cutter mechanism F. The control lever 94 is now moved to pull position as shown in Fig. 10. This causes the control valve parts to be moved so that the piston 14 makes a rearward stroke, to pull the strap end 50 which in turn pulls the strap so that the loops 48, 49 are pulled tight around the hose 51, as shown in Fig. 7. The position of the valve parts when the control lever 94 is moved to pull position is shown in Figs. 10 and 11. It will be seen that air inlet valve 86 is open. If the machine is just beginning a cycle it may be necessary to move the valve stem 88 inwardly by hand by pressing button 95 but ordinarily this is required only when the machine has been at rest for some time. The valve stem 102 is moved forwardly, by reason of the linkage 138, when the control lever 94 is moved to pull position. This causes cup valve 103 to move forwardly so that conduit 122 connects the forward end of cylinder 10 with valve chamber 82, between cup valves 103, 104. Hence, compressed air flows through conduit 108, chamber 84, conduit 100, chamber 82 and conduit 122 into the cylinder 10 to drive piston 14 rearwardly. Meanwhile cup valve 104 is moved forwardly concurrently with valve 103, so that the rear end of the cylinder chamber 109 communicates with the atmosphere, through conduit 124a, pipe 125, conduit 124, cylinder chamber 82, and exhaust conduit 127, to atmosphere.

Figure 8:
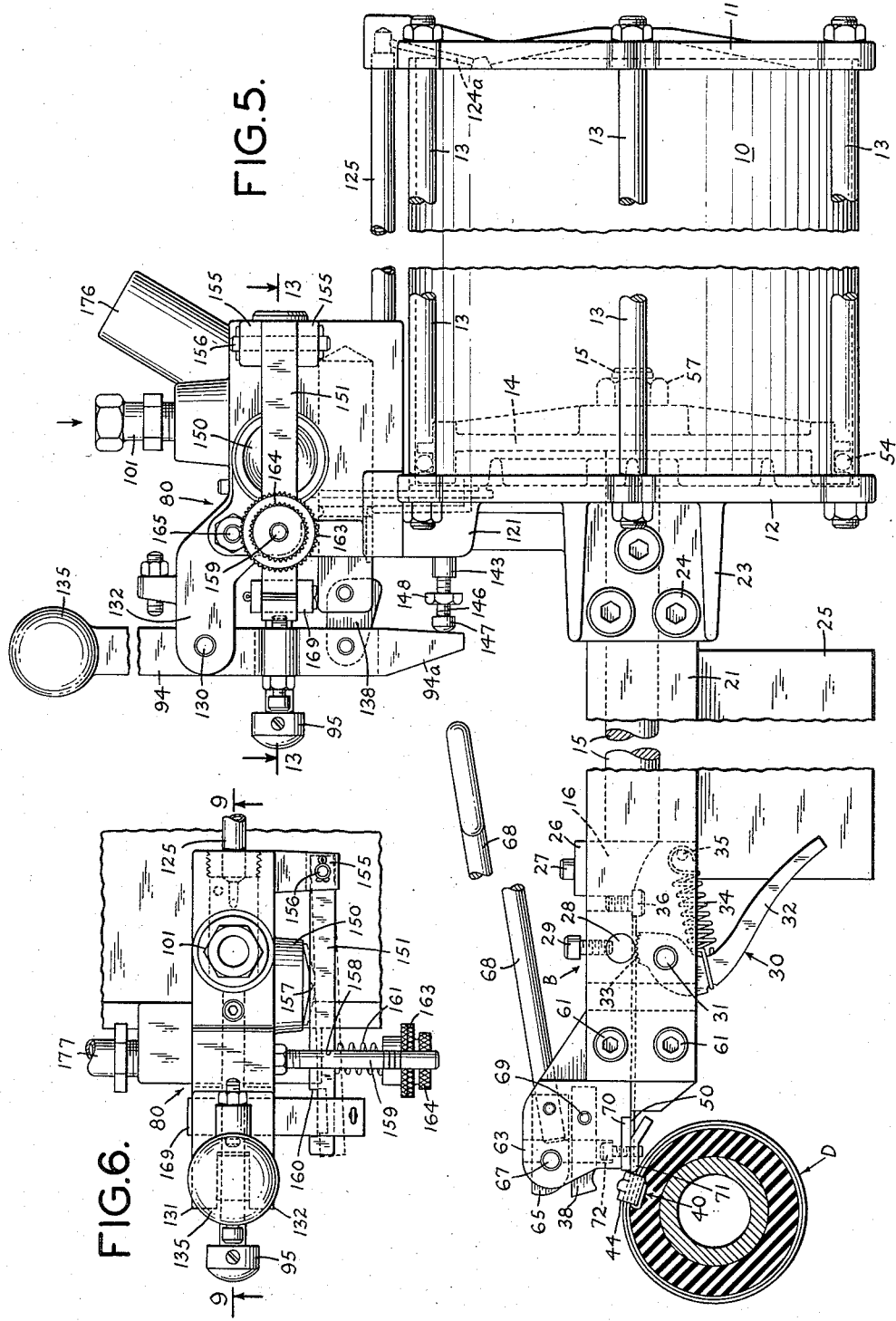
Fig. 8 is a partial view in section similar to Fig. 7 showing the protruding end of the strap being severed at the buckle after the strap has been pulled taut.

It may be assumed for purposes of description, that the index nut 163 on stud pin 159 has been set to correspond to index ring 166a (as shown in Fig. 4) and the index rings are calibrated so that this index ring 166a corresponds to 40 pounds per sq. in. on gauge 176. As the piston moves rearwardly because of the air pressure against it, it will pull the strap 50 taut. The air pressure in cylinder 109 finds its way through conduit 153 (see Figs. 11, 13) through port 154, back of pusher piston 150 in cylinder 110. As the pressure is built up in cylinder 109 it builds up correspondingly in cylinder 110, tending to push the piston 150 outwardly against trip lever 151 which outward movement is opposed by spring 161 on stud pin 159. Assuming the nut 163 was adjusted to place a compression on spring 161 corresponding to 40 pounds per sq. in. on gauge 176, then when the pressure on piston 14 is 40 pounds per sq. in., there will be a corresponding pressure on tripper piston 150 and this will move the trip lever 151 outwardly against the opposing force of spring 161. This will cause the parts to move into the position shown in dot-dash lines in Fig. 13. That is, the hook end 151a of trip lever is released from hooking engagement with inlet valve arm 169. Inasmuch as this arm had been held by lever 151 so that inlet valve was held open and it is now released, the inlet valve spring 92 which normally exerts a force on inlet valve 86, causes the inlet valve 86 to move to closed position and shuts off the compressed air so that it cannot pass into the main cylinder. That is, when the tripper piston 150 is actuated and trip lever 151 is tripped at the pressure at which the index has been pre-set, inlet valve 86 is closed and no more compressed air flows into the main cylinder. Consequently, the pull on the strap of the clamp becomes no greater than the pressure at which the control valve was pre-set to trip. As soon as the trip lever is tripped and the piston rod 15 is exerting a predetermined pull on the end 50 of the strap, pulling the loops tightly around the hose, the control lever 94 is then shifted to neutral position as shown in Fig. 9. However, it should be borne in mind that at the stage of the cycle now being described, the piston has been moved to the rear end of cylinder 10 and the gripper mechanism B is exerting a pulling force on strap 50 as indicated in Fig. 7. When the control lever is moved to neutral position, after the trip lever 151 has tripped and the inlet valve 86 has closed, the cup valves 103, 104 are in the position shown in Fig. 9. In this position the compressed air in cylinder 109 is slowly bled through conduit 122 and groove 120 to atmosphere. This will relieve the pressure on piston 14 and hence the pull on piston rod 15 and, in turn, the pull on the strap end 50 of the hose clamp. When the pull is slackened a little this permits enough slack in the protruding end portion 50 of the strap to permit the hose to be turned on its longitudinal axis. The position just before turning the hose is shown in Fig. 7 and the position of the clamp after turning the hose is shown in Fig. 8. As stated above, enough air is bled from cylinder chamber 109 to permit enough slack to turn the hose so the clamp buckle will assume the position shown in Fig. 8. In another manner of stating it, the hose clamp is rotated in such fashion that the end 50 of the strap is bent against the end 45 of the buckle 40, as shown in Fig. 8. As soon as the buckle 40 is moved to the position shown in Fig. 8, the hook portion 76 of hook lever 38 is caused to engage the other end 44 of the buckle 40. At the same time the handle 68 of the cutter mechanism F is manually raised to rotate cam lever 65 about its pivot 67 so that cam face 66 bears against the top surface of hook lever 38. By exerting sufficient force on handle 68, the hook 76 exerts a force through buckle 40 toward the portion of the strap 50 which is in engagement with the end 45 of the buckle and forces the opposite side of the bent portion of the strap against the cutter edge 74 of shear blade 71. The result is that the strap portion 50 is sheared off flush with the top surface 41 of buckle 40, leaving a bent up portion 50a (see Fig. 3) abutting the end 45 of the buckle but sheared off neatly and flush with the top surface of the buckle. Thus the protruding end 50 of the strap of the hose clamp is severed and this leaves a piece of strap still held by the gripper B. But the hose clamp has been released from the machine and is securely affixed to the hose as shown in Figs. 2 and 3, presenting a very neat appearance and the loops 48 and 49 of the hose clamp are held under tension by the hook portion 47 of the strap engaging the buckle at its inner end and the short hook portion 50a of the strap engaging the buckle at its outer end.

The hose clamp D having been applied to the hose 51 and the clamped hose released from the machine, the piston 14 is then caused to move in its forward stroke to starting position ready for attaching another hose clamp. This is accomplished by shifting the control lever to return position as shown in Fig. 12.

As observed in Fig. 12, when the control valve is shifted to return position, it is rotated counterclockwise on pivot 130 (as viewed in Fig. 12). This causes stop bolt 174 to engage inlet valve arm 169 to insure opening of inlet valve 86. Also link 138 pushes valve stem 105 inwardly in cylinder chamber 82 so that cup valves 103 and 104 are positioned to vent the front end of main cylinder chamber 109 to atmosphere, through conduit 122 and groove 120. At the same time compressed air from the compressed air source (not shown) passes through conduit 108, chamber 84, conduit 100, chamber space 82, conduit 124, pipe 125 and conduit 124a into the rear end of cylinder chamber 109. This drives the piston 14 in its forward stroke. This, in turn, drives piston rod 15 and gripper mechanism B forward to the position shown in Fig. 5; it being noted that pusher rod 146 causes control lever 94 to assume its neutral position when the piston 14 reaches the end of its forward stroke. At the same time the cut off piece of strap 50 is moved forward by gripper B and at the end of the stroke cam lever 30 engages plate 75 causing the lever to be rotated counterclockwise so that cam face 33 releases the piece of strap which was left in the gripper when the hose clamp was manually severed by the cutter mechanism F.

A complete cycle has been described and the machine is now in starting position ready to repeat the cycle and apply another hose clamp. It may be noted here that elastomer bumper 56 on piston rod 15 is provided so that in the event a strap accidentally bursts when it is being pulled taut by piston 14, the quick movement of the piston which results from a breakage of the strap is arrested by the elastic bumper sleeve 56.

A modified form of pressure indicator and valve tripping adjustment device is illustrated in Figs. 14, 15 and 16. In this modification, the machine and control valve are substantially like that previously described except that pressure gauge 176 may be discarded and a pressure indicator 276 has been provided and the compressed air inlet has been moved to the end of the air inlet cylinder chamber 282.

A valve cylinder block 280 is provided with inlet valve chamber 282, corresponding generally to chamber 82 in the control valve previously described. However, the plug 293 is hollow and is provided with a bushing 293a suitable for attachment to a source of compressed air. Compressed air enters through hollow plug 293 and may pass around valve 286 which is slidable in chamber 282. However, a washer 296 of resilient material will close the valve when the valve 286 is seated by the spring 292.

A stud pin 259 is mounted in block 280 and it carries a helical spring 261, one end of which rests against trip lever 151 and the other against a seat formed in a cup shaped nut 263, threaded to screw inwardly and outwardly on stud pin 259. When the adjustment nut 263 is screwed inwardly it puts a higher compression on spring 261 and has a lesser compression when screwed outwardly. A lock nut 264 is provided to maintain the nut 263 in adjusted position. The inner end of the adjustment nut 263 has an annular face 400 in a plane at right angles to the long axis of stud pin 259. This annular surface 400 engages one end 408 of an indicator lever 401 which is pivotally mounted on a pivot pin 402, mounted in the body portion 403 of the pressure indicator 276. The body portion comprises a sector shaped plate having bracket 404 for securely mounting it to cylinder block 280. At its upper end the indicator plate 403 has a scale 405 having indices representing pounds pressure per square inch. The scale 405 is located beneath and opposite the pointer end 406 of the indicator lever 401. The length of the lever from its pointer end 406 to its pivot 402 is relatively long, whereas the length of the other lever arm, from the pivot to its end is relatively short. The short arm, herein for convenience of description designated as the contact arm 407 of the lever 401, is of special shape, namely, curved, so that the curved end 408, which is in contact with the annular face 400, has a fixed radius. Hence, when the cup nut 263 is turned to move inwardly or outwardly on the pin 259, the indicator lever 401 will be rotated on its pivot 402. It will be noted that a tension helical spring 409, one end of which is secured to the long arm 406 of lever 401 and the other end of which is secured to block 280, exerts a pull tending to rotate the lever counterclockwise and thus maintain contact surface 408 of the lever 401 in engagement with the annular surface 400 of the cup nut 263. The helical spring 261 is selected and the indicator scale calibrated so that the pointer 406 will indicate on scale 405 the pressure in numerical value (preferably pounds per sq. in.) at which the pusher piston 150 will trip the trip lever 151. Hence, if it is desired that the trip lever 151 be tripped at 30 pounds per sq. in. when the piston 14 of the main cylinder exerts a corresponding pull on a hose clamp, the cup nut 263 is adjusted on pin 259 so that the pointer 406 lies opposite the index "30" on indicator scale 405. If a higher tripping pressure is desired, the cup nut 263 is screwed inwardly to place more compression on spring 261 and the pressure at which the valve will trip will be indicated by the pointer on scale 405.

It will be observed also that the conduit 253 (corresponding to conduit 153 in Fig. 11) does not extend into the main cylinder chamber 109, but it is connected to conduit 122 by a passageway 253a (see Fig. 14). This does not change the function of conduit 253 because the pressure within main cylinder chamber is still carried into cylinder chamber 210, (see Fig. 16) (corresponding to cylinder chamber 110 in Fig. 13). Otherwise the control valve shown in Figs. 14, 15, 16 operates in substantially the same way as the embodiment disclosed in Figs. 1 to 14 inclusive.

The terms and expressions which have been employed herein are used as terms of description and not of limitation, and there is no intention, in the use of such terms and expressions, of excluding any equivalents of the features shown and described or portions thereof, but it is to be recognized that various modifications are possible within the scope of the invention claimed.

What is claimed is:

1. A power operated tensioning device for a hose clamp applying tool, having a guide frame and a gripper mechanism movable along said frame for applying a pressure clamp having a length of strap and buckle through which the strap passes which device comprises a main cylinder, a piston mounted in said main cylinder for reciprocation, a piston rod secured to said piston and moving in response to movement of said piston and adapted to be connected to the gripper mechanism, and valve and conduit means operative to admit pressure fluid selectively to the chamber space in front of said piston to drive said piston rod in a rearward direction along said frame to pull said strap taut prior to cutting the strap and to the chamber space behind said piston to drive said piston rod in the opposite direction along said frame after said strap has been cut, a trip lever member on said valve means, and piston means in said valve means operative in response to fluid pressure in said main cylinder to trip said lever member and thereby shut off flow of pressure fluid through said conduit means into said main cylinder when the pressure in the space in front of said piston reaches a predetermined amount.

2. A tensioning device for a hose clamp applying tool having a frame and a gripper mechanism movable along said frame for applying a pressure clamp having a length of strap and buckle through which the strap passes said device comprising a main cylinder, a piston mounted in said main cylinder for reciprocation, a piston rod secured to said piston adapted to be connected to the gripper mechanism, pressure fluid conduit means, valve means connected to said conduit means and operative to admit pressure fluid selectively to the chamber space in front of said piston to drive said piston rod rearwardly along said frame and to the chamber space behind said piston to drive said piston rod in the opposite direction along said frame, and trip mechanism coactive with said valve means and actuated in response to change of fluid pressure in said main cylinder to trip said valve means to prevent further admission of pressure fluid into said main cylinder when the pressure in said cylinder reaches a predetermined amount, and means to pre-set said mechanism to trip said valve means when the pressure in said main cylinder reaches a predetermined amount.

3. A band strap tensioning device for a band clamp applying tool having a guide frame, and a gripping mechanism movable along said frame, said tensioning device comprising a main cylinder, a main piston mounted for reciprocation in said main cylinder, a main piston rod secured to said piston movable in a forward stroke and a rearward stroke in response to reciprocative movement of said piston and adapted to be secured to the gripper mechanism, and valve means connectable to a source of compressed air and operative to admit compressed air from said source selectively to the chamber space behind said main piston to drive said piston rod forwardly in a forward stroke along said frame and to the chamber space behind said main piston to drive said piston rod in the opposite direction in a rearward stroke along said frame, said valve means including a trip mechanism actuated in response to change of air pressure in said main cylinder to shut off the passage of compressed air from said source to said main cylinder, said trip mechanism including a trip lever actuated by air pressure and pre-setting means operative to cause said lever to be tripped at a predetermined air pressure.

4. A tensioning device constructed according to claim 3 in which said valve means includes a first inlet valve, a trip cylinder chamber, a pusher piston mounted for reciprocation in said trip cylinder chamber in response to change of air pressure in said main cylinder, and said trip lever is pivotally mounted for swingable movement on its pivot in response to movement of said pusher piston, said trip lever normally holding said inlet valve open but releasing its hold on said inlet valve when tripped in response to actuation of said pusher piston.

5. A tensioning device constructed according to claim 3 in which the trip mechanism includes a spring biased member which is adjustable and can be pre-set so that the tripping mechanism will trip when a predetermined pressure is reached in said main cylinder and thereby cause compressed air from said source to be shut off from said main cylinder.

6. A tensioning device constructed according to claim 4 in which said first inlet valve has an inlet valve arm engaged by said trip lever, a spring engaging said trip lever and urging said lever against said arm to hold said inlet valve open, the force exerted by said spring on said lever being adjustable, and means for adjusting the compression on said spring, said pusher piston being actuated and said lever being tripped in response to air pressure in said main cylinder, and when tripped, said lever releasing its hold on said inlet valve arm to permit said inlet valve to close.

7. A tensioning device adapted for use on a hose clamp applying tool comprising a main cylinder providing a main cylinder chamber, a main piston mounted in said main cylinder chamber for reciprocation, a piston rod secured to said main piston, and control valve means connected to said main cylinder, said control valve means comprising a cylinder block, a first valve chamber in said block connectable to a pressure fluid source, a closeable and openable inlet valve in said first chamber, a second chamber in said block communicating with said first chamber and having a first port communicating with the fore end of said main cylinder chamber and a second port communicating with the rear end of said main cylinder chamber, valve members operative to selectively close said first and second ports to selectively admit pressure fluid from said source to the main chamber space behind said main piston to drive said piston rod forwardly and to the main chamber space in front of said piston to drive said piston rod in the opposite direction and trip mechanism including a trip piston chamber connected to said main cylinder, said trip piston chamber having mounted therein a piston operative in response to change of fluid pressure in said main cylinder to actuate said valve members to prevent further admission of fluid pressure into said main cylinder when the pressure therein reaches a predetermined amount.

8. A tensioning device for a power tool for applying a pressure band clamp having a length of strap and buckle through which the strap passes which tool has a gripping means to grip the end of a band clamp, said device comprising a main cylinder providing a main cylinder chamber, a main piston mounted for reciprocation in said main cylinder chamber, a piston rod secured to said main piston and moving in a forward stroke and a rearward stroke in response to reciprocation of said main piston and adapted to be connected to the gripper means, and control valve means connected to said main cylinder, said control valve means comprising a cylinder block, an inlet chamber in said block, means for connecting said inlet chamber to a source of compressed air, a closeable and openable inlet valve in said inlet valve chamber, a first stem connected to said inlet valve and extending from said block, a second valve chamber in said block communicating with said inlet chamber and having a first port communicating with the fore end of said main cylinder chamber and a second port communicating with the rear end of said main cylinder chamber, a second valve in said second valve chamber, a second stem connected to said second valve, a control handle mounted on said block, means connecting said handle to said second stem, said handle being operative to move said second valve to open said first port and close said second port to cause compressed air entering said inlet chamber to pass into the space in said main cylinder in front of said main piston to drive said main piston in a rearward stroke and operative to move said second valve to close said first port and open said second port to cause compressed air entering said inlet chamber to pass into the space in said main cylinder behind said main piston to drive said main piston in a forward stroke.

9. In a power tool for applying a pressure clamp having a length of strap and buckle through which the strap passes which tool has a gripper mechanism to grip the end of a band clamp, said device comprising a main cylinder providing a main cylinder chamber, a main piston mounted for reciprocation in said main cylinder chamber, a piston rod secured to said main piston and moving in a forward stroke and a rearward stroke in response to reciprocation of said main piston, control valve means connected to said main cylinder, said control valve means comprising a cylinder block, an inlet chamber in said block, means for connecting said inlet chamber to a source of compressed air, a closeable and openable inlet valve in said inlet valve chamber, a first stem connected to said inlet valve and extending from said block, a second valve chamber in said block communicating with said inlet chamber and having a first port communicating with the fore end of said main cylinder chamber and a second port communicating with the rear end of said main cylinder chamber, a second valve in said second valve chamber, a second stem, connected to said second valve, a pivoted control lever mounted on said block, link means connecting said lever to said second stem, said control lever being operative to move said second valve to open said first port to compressed air and close said second port to compressed air to cause compressed air entering said inlet chamber to pass into the space in said main cylinder in front of said main piston to drive said main piston in a rearward stroke and operative to move said second valve to close said first port to compressed air and open said second port to compressed air to cause compressed air entering said inlet chamber to pass into the space in said main cylinder behind said main piston to drive said main piston in a forward stroke.

10. A tensioning device constructed according to claim 9, in which said control lever may be moved to a first position, designated as pull position, a second position, designated as neutral position, and a third position, designated as return position, said control lever when in pull position causing said inlet valve to remain open unless tripped and said second valve in said second valve chamber to open said first port to compressed air but close it to atmosphere and to open said second port to atmosphere thereby to cause compressed air to move said main piston rearwardly to pull said clamp strap taut, said control lever when in neutral position causing said second valve to open both of said ports to atmosphere, and said control lever when in return position causing said second valve to open said second port to compressed air but to close it to atmosphere and to open said first port to atmosphere but close it to compressed air.

11. A tensioning device constructed according to claim 9 in which a third cylinder chamber, designated a trip cylinder chamber, is provided in said valve cylinder block, and having a pusher piston mounted for reciprocation in said trip cylinder chamber and movable in response to change of air pressure in said main cylinder, a trip lever operative to trip in response to outward movement of said pusher piston, said trip lever normally holding said inlet valve open but releasing its hold on said inlet valve when tripped in response to outward movement of said pusher piston, and valve biasing means acting to close said inlet valve when said trip lever releases its hold on said inlet valve.

References Cited in the file of this patent

UNITED STATES PATENTS

| | | |
|---|---|---|
| 1,700,668 | Damerell | Jan. 29, 1929 |
| 2,334,637 | McKee | Nov. 16, 1943 |
| 2,600,394 | Conklin | June 17, 1952 |
| 2,633,709 | Dales | Apr. 7, 1953 |
| 2,676,462 | Berry | Apr. 27, 1954 |
| 2,727,359 | Staller | Dec. 20, 1955 |
| 2,729,994 | Hewitt | Jan. 10, 1956 |
| 2,746,324 | Beardsley | May 22, 1956 |